United States Patent [19]
Habersberger

[11] 3,764,707
[45] Oct. 9, 1973

[54] ALGIN SALT-MANNOGALAC- FOR GUM CONTAINING AQUEOUS COSMETIC LOTION

[75] Inventor: Francis Habersberger, Westfield, N.J.

[73] Assignee: Marine Colloids, Inc., Springfield, N.J.

[22] Filed: Mar. 4, 1970

[21] Appl. No.: 16,581

[52] U.S. Cl.................. 424/361, 106/208, 424/180, 424/363
[51] Int. Cl. ............................................ H61k 7/00
[58] Field of Search.................... 424/180, 361, 363; 167/91, 92; 99/131; 106/208

[56] References Cited
UNITED STATES PATENTS

| | | | |
|---|---|---|---|
| 2,405,861 | 8/1946 | Tod................................ | 424/361 X |
| 2,441,729 | 5/1948 | Steiner........................... | 424/361 X |
| 2,635,067 | 4/1953 | Steiner et al...................... | 424/361 |
| 2,918,375 | 12/1959 | Gibsen.............................. | 99/131 |
| 2,930,701 | 3/1960 | Merton et al...................... | 99/131 |
| 2,935,409 | 5/1960 | McDowell et al................... | 99/131 |
| 3,016,302 | 1/1962 | Hunter............................. | 99/131 |
| 3,164,523 | 1/1965 | Fox et al........................... | 424/363 X |
| 3,352,688 | 11/1967 | Messina............................ | 99/131 |
| 3,455,701 | 7/1969 | Miller et al......................... | 99/131 |

OTHER PUBLICATIONS
Thomssen, Modern Cosmetics, 3rd Ed., Drug & Cosmetic Industry, New York, (1947), pp. 221–229.

Thomsen, American Perfumer and Cosmetics, Vol. 78, Oct. 1963, pp. 45–50.

*Primary Examiner*—Albert T. Meyers
*Assistant Examiner*—Vera C. Clarke
*Attorney*—R. W. Furlong

[57] ABSTRACT

An improved cosmetic lotion having desirable rheology is disclosed as comprising a dissolved mannogalactan gum and as a dispersed phase swollen hydrated particles of algin salt containing cations selected from the group consisting of calcium and aluminum. The ratio by dry weight of the algin salt to the gum is from about 5:1 to about 3:1 and desired rheology is obtained by controlling the cation content selected from the group calcium and aluminum relative to the content of the algin salt so that the viscosity of the lotion at 25° C. is from about 5,000 to about 20,000 cps. when the concentration of the algin salt in the lotion is from about 0.5 percent to about 1.1 percent. The gum concentration is from about 0.14 percent to about 0.24 percent. The lotion may contain beneficiating materials such as glycerine and alcohol. It preferably contains boric acid which has a modifying effect on the gum and, in addition, an acid such as fumaric. The invention relates to the lotion and for use in making it a solid composition and a glycerine base slurry. Its production involves equilibrating cation concentration from suitable cation sources for obtaining desired rheology.

3 Claims, No Drawings

ALGIN SALT-MANNOGALAC- FOR GUM CONTAINING AQUEOUS COSMETIC LOTION

DESCRIPTION OF INVENTION

Field of Invention

This invention relates to cosmetic lotions and materials and method for the manufacture thereof. It relates more especially to aqueous cosmetic lotions characterized by a continuous aqueous medium in which there is a dispersion of hydrated particles that in combination with the aqueous medium impart desirable rheology. The continuous aqueous medium ordinarily contains dissolved therein a skin-softening agent such as glycerine and such other beneficiating substances as may be desired. A lotion of the kind in question is suitable for application to the skin, e.g., to the hands, or other parts of the body, as a cosmetic.

BACKGROUND OF THE INVENTION

The most commonly employed base for a cosmetic lotion of the character aforesaid is ribbon gum tragacanth gum. Ribbon gum tragacanth differs from ordinary gum tragacanth primarily in that it exhibits higher viscosity characteristics when dissolved in water. Ribbon gum tragacanth contains two components. One of these components is water soluble and goes into solution when the gum is dissolved in water to form a continuous aqueous phase or medium. The other component, which is the major one, has the property of becoming hydrated to a swollen state such that the particles while remaining undissolved occur in what may be referred to as an interrupted gel structure. It is these particles that play an important part in contributing to one of the most important properties of a cosmetic lotion, namely, desirable rub-in properties. However, the continuous liquid phase also is important in controlling flow properties, stabilizing viscosity, preventing gelation and serving as a suspending medium for the dispersed hydrated particles. The continuous liquid phase also serves as the vehicle for any beneficiating additives. Usually a humectant such as glycerine is dissolved in the continuous aqueous phase; a healing agent and a coolant such as alcohol also may be present.

While cosmetic lotions based on the use of ribbon gum tragacanth have been widely manufactured and sold, such lotions have certain inherent shortcomings. One of the principal shortcomings in the use of ribbon gum tragacanth is that it is a natural gum that is subject to relatively wide variations in properties, especially variations in viscosity, which variations may be so great as to make standardization of a lotion to predetermined specifications extremely difficult or impossible. Moreover, upon continued rub-in, ribbon gum tragacanth tends to become undesirably sticky. The supply also is uncertain, making it necessary from time to time to go to a lower grade of purity. The current cost of over five dollars per pound is relatively high and a less costly material has obvious economic advantage.

OBJECTS OF INVENTION

It is an object of this invention to provide a substitute for ribbon gum tragacanth as the base for a cosmetic lotion. It is a further object of this invention to provide a substitute for ribbon gum tragacanth by the use of which the aforesaid shortcomings of ribbon gum tragacanth may be minimized or overcome. It is a further object of this invention to obtain the aforesaid objectives and advantages utilizing a material that is substantially less costly than ribbon gum tragacanth and that facilitates production of a cosmetic lotion in a controlled manner to predetermined specifications.

GENERAL DESCRIPTION OF INVENTION

The foregoing objectives have been realized according to the present invention by employing, as the dispersed phase of a cosmetic lotion, hydrated swollen particles of an algin salt dispersed in a continuous aqueous phase containing a dissolved mannogalactan gum, the cations of the algin salt being selected from the group consisting of alkali metals and ammonium and from the group consisting of calcium and aluminum, the cations selected from calcium and aluminum being in controlled relation with respect to the cations selected from the group consisting of alkali metals and ammonium which results in the occurrence of desirable rheology characteristics in the lotion. The ratio by dry weight of the algin salt to said gum is from about 5:1 to about 3:1 and the desired rheology is obtained when the content of cations selected from the group consisting of calcium and aluminum is that which imparts to the lotion a viscosity at 25° C between about 5,000 and about 20,000 cps. This viscosity and the viscosity values mentioned elsewhere herein and in the claims are determined using a Brookfield LVF viscometer and, unless otherwise specified, a No. 3 spindle is used.

Features of the invention relate to the cosmetic lotion, to the dry pulverulent composition and to the glycerine base slurry that preferably is employed in its production and to the method by which the lotion is prepared.

Algin is a complex hydrocolloid obtained in known ways from suitable seaweeds such as Laminaria, Phaeophyceae, Macrocystis, Nereocystis, and the like. Algin is precipitated by acid and is soluble in aqueous alkaline media wherein the alkalinity is due to the presence of alkali metals or ammonium. In the presence of certain di- and trivalent cations it is insoluble. Because of such properties algin often is referred to as occurring in the form of insoluble alginic acid and in the form of a salt, the salts of the alkali metals and ammonium being soluble in water and the salts of certain di- and trivalent metals, such as calcium and aluminum under consideration herein, being insoluble.

Algin usually occurs in the salt form and as extracted from seaweed is in the solube salt form with sodium as the predominant cation as the result of extraction under mild alkaline conditions using an alkaline-reactive compound of sodium. Moreover, the seaweed from which algin is extracted contains substantial quantities of the salts of sodium, potassium and magnesium. It also is common practice to cause algin contained in an extracted solution to occur as a separable precipitate by converting it to insoluble calcium alginate and thereafter treat the precipitate with an alkaline compound of sodium to cause it to return to the soluble sodium salt form. But in practice, the return is not complete and there is retention of some calcium. In any case, soluble sodium alginate as conventionally produced usually contains calcium to the extent of about 1 percent by dry weight of the sodium alginate.

Due to the preferential affinity exhibited by algin for calcium rather than sodium, it is a well-known fact that sodium cations associated with sodium alginate may be replaced in varying degrees by calcium cations merely by the inclusion of an ionizing compound of calcium in common solution with sodium alginate. While it is theoretically possible to replace substantially all of the sodium cations with calcium cations, in which case the percentage by weight of calcium would be approximately 10 percent, equilibrium conditions usually are reached when the calcium content is substantially less. Therefore, when the calcium content is in excess of about 6.5 percent the algin becomes so insoluble as to precipitate out, leaving water as the supernatant liquid and when the algin is thus caused to contain enough calcium to cause the algin to precipitate out of solution it commonly is referred to as calcium alginate.

If the calcium content of sodium alginate is increased from the norm of about 1 percent so as to be about 2 percent, as by dissolving sodium alginate in a very dilute solution of a calcium salt such as calcium chloride, the characteristics of sodium alginate as conventionally made and sold commercially are retained except that solutions thereof are more viscous and tend to be of a somewhat more pasty consistency.

U.S. Pat. No. 2,400,834 discloses several procedures for producing a soluble or dispersible alginate wherein the calcium content is of the order of 3.1 percent to 3.5 percent by weight, the resulting alginate being referred to in said patent as alkalino-calco-alginate. In general, the procedure disclosed therein for producing the alkalino-calco-alginate comprises mixing alginous material in water with a slightly soluble compound of calcium such as calcium sulfate or calcium carbonate in any effective amount for causing the alginous material to contain from 3.1 percent to 3.5 percent of calcium on the weight of the alginous material while at a pH that is sufficiently low to retard ion exchange reaction during the period in which uniform blending is being accomplished. Upon thereafter raising the pH, the ion exchange reaction occurs with transfer of the calcium to the alginous material to the aforesaid desired extent, the remaining salt-forming function of the algin being combined with sodium or other alkali metal or ammonium. The resulting product is disclosed as retaining the solubility and other desirable properties associated with sodium alginate and, in addition, as having the improved property of being less susceptible to precipitation induced by the presence of ionizable compounds of calcium in milk products. The improved alkalino-calco-alginate is disclosed as being especially useful for use in the manufacture of ice cream. When so used, it goes into solution readily to produce a solution of very high viscosity at a concentration of around 1 percent with a tendency toward gelation. The possible occurrence of the sodium-calco-alginate in the form of swollen particles is not disclosed.

In the practice of this invention algin is caused to become dispersed in the form of a multiplicity of minute swollen particles in an aqueous medium containing a mannogalactan gum.

The algin is caused to occur in the form of minute swollen particles by controlled equilibration between a solubilizing cation such as sodium and an insolubilizing cation selected from calcium and aluminum. The hydrated swollen particles are obtained in preferred form when the algin is in the form of sodium calcium alginate wherein the content of calcium is about 4.3 percent of the alginate salt. However, it is to be understood that 4.3 percent is optimum and that the occurrence of the algin in the form of suitable swollen hydrated particles is obtainable when the content of calcium in the sodium calcium alginate is from about 3 percent to about 6.5 percent by dry weight of the algin salt. If calcium content is increased above 6.5 percent the algin salt tends to precipitate out. The viscosity of a solution of sodium calcium alginate is excessive when the calcium content is around 2 percent and approaches 3 percent. The control in viscosity that is achieved by the control of the percentage of calcium in the sodium calcium alginate also serves to control the swollen hydrated condition of the particles whereby the interrupted gel structure of desired rheology is obtained when the particles are dispersed in the aqueous medium containing the mannogalactan gum.

Hydrated swollen particles having corresponding desirable physical properties are obtainable if the calcium content is replaced by aluminum cations which constitute from about 0.8 percent to about 1.5 percent by dry weight of the algin salt. However, the employment of sodium calcium alginate is preferred and for this reason much of the following description is specific to the employment of sodium calcium alginate as exemplifying the practice of this invention.

When, in accordance with this invention, hydrated swollen particles of sodium calcium alginate containing from about 3 percent to about 6.5 percent of calcium by dry weight of the alginate salt are caused to become dispersed in an aqueous medium containing a mannogalactan gum it has been found that a rheology is obtainable that is highly desirable as the base for a cosmetic lotion and that is comparable to that incident to the use of ribbon gum tragacanth but without the shortcomings of ribbon gum tragacanth. The presence of the mannogalactan gum is essential in that it acts as a spacer for the hydrated particles of sodium calcium alginate so as to provide an interrupted gel structure having improved flow characteristics and so as to prevent formation of a gel or semi-gel on standing as distinguished from a flowable viscous consistency.

While it is sodium calcium alginate as above defined that normally is employed in the practice of this invention, the sodium cation may be replaced in whole or in part by another alkali metal or ammonium. Thus the algin salt also could be, for example, potassium calcium alginate or ammonium calcium alginate wherein the calcium cation occurs within the percentage range hereinabove stated. Moreover, the cations selected from the group consisting of alkali metals and ammonium could include two or more of said cations. However, in commercially produced sodium alginate the cation selected from the group alkali metal and ammonium cations consists primarily of sodium cations.

When aluminum is employed instead of calcium, the desired hydrated swollen condition is obtained when the amount of aluminum is from about 0.8 percent to about 1.5 percent by dry weight of the algin salt. While other di- and trivalent cations exercise an insolubilizing effect on algin, their employment is regarded as less desirable for the purposes of this invention than cations selected from the group consisting of calcium and aluminum. As aforesaid, calcium is much to be preferred and normally is used as the insolubilizing cation in the production of desired rheology in the practice of this invention.

For purposes of brevity, much of the following description and exemplification of the practice of this invention is in connection with sodium calcium alginate. However, it is to be understood that the description and exemplification set forth herein are to be taken in the light of the foregoing as regards the employment of other alkali metals or ammonium and the employment of aluminum instead of calcium.

Because the capacity of sodium calcium alginate particles to abstract water with resultant swelling is very great only a small amount thereof, on the dry weight basis, should be present. In preferred practice of the invention the amount of sodium calcium alginate by dry weight in the complete cosmetic lotion is approximately 0.7 percent, of the weight of the complete lotion. However, depending somewhat on personal preference and on the specific constitution of the sodium calcium alginate, the dry weight of the sodium calcium alginate may vary from about 0.5 percent to about 1.1 percent of the weight of the lotion.

The mannogalactan gum that is dissolved in the aqueous continuous phase of the cosmetic lotion cooperates with the hydrated swollen particles of sodium calcium alginate in contributing to acceptable rheology. A principal function of the gum is that of occupying the spaces between the particles of sodium calcium alginate so as to maintain their relative mobility whereby desired rheology, including pourability, may be attained and maintained. In the absence of the gum there would be a tendency of the particles to form a gel structure that would drastically alter desired consistency and rheology especially upon long standing or when extreme changes in temperature are encountered. The gum also contributes somewhat to the viscosity of the lotion and to its rub-in characteristics. The ratio by dry weight of sodium calcium alginate, or other algin salt of the kind specified herein, to gum may be varied from about 5:1 to about 3:1 by dry weight. The mannogalactan gum may be such as to constitute from about 0.14 percent to about 0.24 percent by weight of the dry composition.

The mannogalactan gums that are preferred and that oridnarily are used are gums selected from the group consisting of tara, guar and locust bean. These gums may readily be put into solution and have been found to contribute to the attainment of desirable physical properties in the complete lotion.

When the lotion is prepared in preferred form with the concentration of non-aqueous ingredients at about 1 percent and when sodium calcium alginate is employed wherein the calcium content is about 4.3 percent and constitutes about 0.7 percent by dry weight of the weight of the lotion, the lotion has a viscosity of about 7,500 cps. However, depending largely on personal preference, the viscosity may vary from about 5,000 cps. to about 20,000 cps. There are several factors that affect viscosity. Thus, at a given concentration sodium calcium alginate containing about 3 percent by dry weight of calcium has a substantially greater viscosity than a sodium calcium alginate containing 6.5 percent by dry weight of calcium. Moreover, the viscosity-imparting characteristics of the sodium calcium alginate are affected to some extent by the viscosity characteristics of the precursive sodium alginate from which the sodium calcium alginate is made. Thus the sequestered viscosity of the precursive sodium alginate at 1 percent concentration may range from about 200 to about 900 cps. at 25° C. Since the calcium normally present in sodium alginate results in a higher viscosity, the aforesaid sequestered viscosity readings were obtained by sequestering (removing) all native calcium and the readings represent calcium-free viscosities. Sequestering of all calcium was accomplished by the addition of sodium hexametaphosphate as sequestering agent to deionized water in a quantity that resulted in the attainment of the lowest base viscosity. Moreover, in order to obtain the viscosity that is desired for the finished lotion two or more precursive sodium alginates having different viscosities may be blended in suitable relative proportions. The viscosity of the complete lotion also is affected somewhat by the amount of gum that is present within the ratio limits aforesaid. More generally, one may readily impart the desirable viscosity hereinabove mentioned by adjusting relative proportions, by varying the calcium content of the sodium calcium alginate, and by varying the viscosity of the precursive sodium alginate.

The combined effect of the hydrated sodium calcium alginate particles as the dispersed phase and the aqueous gum solution as the continuous phase or medium provides the base for the cosmetic lotion which primarily determines its rheology. Such beneficiating substances as desired may be added to this base. Thus, the glycerine which is conventionally employed as a humectant in cosmetic lotions may be present. The amount is determined largely by personal preference. Preferably the glycerine may constitute about 8 percent of the lotion. Usually an amount of glycerine between about 6 percent and about 10 percent has been found to be suitable. About 4 percent to about 8 percent of a coolant such as alcohol may be included. In the cosmetic lotion of my invention the hydrated particles of sodium calcium alginate become swollen to such extent that they occupy the major portion by volume. Since there is a concomitant decrease in the amount of free aqueous medium, the concentration therein of the beneficiating additives becomes increased, with resultant enhancement of the effectiveness thereof.

While not essential in the practice of this invention, it is preferable to include a small amount of boric acid such that its dry weight is about 0.004 percent to about 0.006 percent of the complete lotion. When in solution, boric acid improves the rub-in properties by imparting a slippery feel to the gum compound. Its action in this respect is believed to be due to a certain amount of reaction between boron contained in the boric acid and the mannogalactan gum. Boric acid also contributes slightly in lowering the pH of the lotion. For application to the skin a pH of about 4.5 to about 5.5 is preferable. In addition to boric acid, other non-irritating compatible acids that are safe for cosmetic use may be employed to lower the pH to the level indicated, such as fumaric, adipic, malic, tartaric and citric. The acid of this type ordinarily constitutes from about 0.009 percent to about 0.011 percent of the weight of the complete lotion. Preferably fumaric acid is employed to control pH since it is relatively inactive and depolymerization of the algin when stored in dry admixture therewith is minimal.

Further features of this invention are concerned with the preparation of the lotion. It is preferable in the practice of this invention to employ an alginate containing less than the desired percentage of calcium and to disperse the alginate particles in a finely-divided state in water along with the ionizable compounds of calcium which constitute a source for providing calcium cations for increasing the calcium content of the algin salt, the cation concentrations being equilibrated so that the calcium content reaches the desired amount while at the same time avoiding contact of the alginate particles either locally or temporarily with the ionizable compound of calcium at such a concentration as to cause the calcium percentage in the sodium calcium alginate to go substantially beyond the desired percentage with resultant excessive insolubilization of the alginate particles, or some of them, and impairment of their hydrophilic properties. It is important that the bulk of the algin salt particles exist in the aforesaid zone of desired calcium content. If algin salt particles are contacted with concentrations of calcium cations in excess of that required for obtaining the desired percentage of calcium therein there is risk of irregular or locally excessive calcium pick-up with resultant non-uniformity and less satisfactory results, including decreased viscosity.

It is preferred in the practice of this invention to disperse in water sodium alginate or sodium calcium alginate deficient in calcium that has been ground to pulverulent form of such fineness that no more than about 5 percent is retained on a U.S. Standard Sieve, Series No. 80, and, while the particles are in suspension, to bring them under the influence of ionized calcium which builds up the calcium content of the alginate particles so as to be at the desired percentage level within the range from about 3 percent to about 6.5 percent on the dry weight of the alginate. In order to afford better control of standardization it is preferable in the production of the lotion to employ deionized or distilled water rather than such fresh water as may be available at a particular place and time which might vary according to its source as regards hardness due to dissolved calcium and to employ therewith sodium alginate or calcium alginate deficient in calcium which has been produced so as to be in accordance with a control specification as regards viscosity and calcium content together with accurately predetermined amounts of ionizable calcium.

It has been mentioned hereinabove that sodium alginate, by reason of its source and the process used in its production, generally contains about 1 percent of calcium. In the practice of this invention the calcium content of the sodium alginate has to be taken into account in determining the total percentage of calcium to be added to the sodium calcium alginate to give the desired rheology. To the extent that sodium alginate or sodium calcium alginate is available with higher calcium contents than 1 percent, such calcium content, as the result of analysis, should be taken into account and a correspondingly lesser amount of ionizable calcium compound must be employed so that the percentage of calcium in the alginate particles comprised in the finished gel may be within the range aforesaid.

It is one of the features of this invention that for use in making the cosmetic lotion a composition is prepared in solid, finely-divided or pulverulent form which comprises sodium alginate or sodium calcium alginate deficient in desired calcium content in admixture with calcium sulfate. Preferably boric acid is present in an amount such as about 0.3 percent to about 0.6 percent by weight of the dry composition. Similarly, an acid such as fumaric acid may be present in an amount such as about 0.7 percent to about 1.1 percent by weight of the dry composition. When the dry composition is added to distilled water in an amount such that the concentration of the algin salt in the resulting dispersion is between about 0.5 percent and about 1.1 percent, the pH preferably is from about 4.5 to about 5.5 The acidic material also serves to increase the rate at which the calcium sulfate dissolves when the composition is added to water in addition to providing a desirable pH for application to the skin. It also is preferable that the composition include in finely divided form the gum component of the cosmetic lotion.

Because of the limited solubility of calcium sulfate the desired calcium content of the sodium calcium alginate cannot be attained without running the risk of having some of the calcium sulfate, which should not occur as a solid in the finished lotion, remain undissolved or be subject to subsequently precipitating out. However, it is preferable that the amount of calcium sulfate approach the saturation point when the composition is dissolved in the amount of water that is employed in making the lotion. The limited solubility of the calcium sulfate is of advantage in that the bulk of the calcium cations for obtaining sodium calcium alginate containing the desired percentage content of calcium is made available with the combination of calcium sulfate and the more soluble calcium chloride without risk of excessively insolubilizing the algin salt or portions thereof. However, the full amount of calcium required cannot be obtained from calcium sulfate alone for the following reasons. If too high a concentration of calcium sulfate is used, there would be a possibility of build-up of undissolved and unreacted calcium sulfate or even crystallization to form gypsum crystals. For these reasons additional calcium must be obtained from another source, preferable one which provides a calcium salt which may be used at a level to supply the additional calcium required but not at a level so high as to incur risk of excessively insolubilizing the algin salt. The most suitable calcium salt has been found to be calcium chloride. Others that also may be used are calcium acetate, calcium lactate, calcium gluconate, calcium nitrate, calcium cyclamate and monocalcium phosphate.

While it is preferable to prepare the lotion from a dry blend of sodium alginate deficient in calcium, calcium sulfate and calcium chloride, it is possible to omit part or all of the calcium sulfate and calcium chloride from the dry composition, and by careful addition of the sodium alginate to water containing calcium chloride, maintain the desired ratio of alginate to calcium for providing hydrated particles of sodium calcium alginate wherein the calcium constitutes from about 3 percent to about 6.5 percent by dry weight of the sodium calcium alginate. However, the production of the lotion in this way to predetermined specifications and desired rheology is more difficult.

It also is possible in accordance with this invention to produce an alginate salt of an alkali metal wherein the desired percentage of calcium is replaced by an appropriate amount of aluminum. In such case, sodium alginate deficient in calcium and/or aluminum may be preblended with aluminum sulfate. In such case, since aluminum sulfate is much more soluble than calcium sulfate care has to be exercised in not excessively unsolubilizing the alginate in whole or in part as the result of employing an excessive amount of aluminum sulfate or by creating local excessive concentrations thereof during mixing. If other aluminum salts are employed such as aluminum chloride, aluminum acetate, etc., the same precautions apply.

The preferred method of addition of the dry composition containing the required amounts of sodium alginate deficient in calcium, calcium sulfate, calcium chloride, boric acid, fumaric acid and mannogalactan gum is to first add the dry pulverulent composition to the glycerine content of the complete lotion formula to make a slurry having glycerine as the base in which the other components are insoluble. The slurry is then added to the deionized water with good agitation as by the use of an electric powered mixer. Under these conditions the alginate and the calcium salts co-dissolve in the proper ratio whether the slurry is added completely in only a few seconds' time or whether it is added slowly or at spaced minute intervals over a period of 1 hour or more.

It is conceivable that in some areas of the United States where conditions of high humidity and high temperature prevail in the summer months the aforesaid dry composition containing calcium chloride may pick up moisture when stored in open drums with the resultant occurrence of some caking. Under such conditions it is beneficial to omit calcium chloride as an ingredient of the aforesaid dry composition and for the calcium chloride to be added separately. In this event, the calcium chloride and the remainder of the dry composition would both be added to the glycerine without premixing. However, when the slurry is prepared in this manner and is added to the deionized water, the same uniform desired conditions of co-dissolution will prevail as previously described.

It is possible to prepare the improved lotion of this invention by initially producing a sodium calcium alginate wherein the calcium content is within the range from about 3 percent to about 6.5 percent by dry weight and merely blend it in with the mannogalactan gum and other components of the lotion. However, it is difficult to produce a sodium calcium alginate of this type so as to consistently meet control specifications and for this reason as well as those mentioned hereinabove it is preferable in the practice of this invention to produce to desired specification a sodium alginate low in calcium and to build up the required calcium percentage during the manufacture of the lotion by the controlled stepwise employment of calcium sulfate and calcium chloride as hereinabove described.

It also is theoretically possible in the practice of this invention to utilize alginate which is in the insoluble calcium alginate form and employ a strong calcium sequestrant such as sodium hexametaphosphate in an amount calculated in relation to the known content of calcium in the calcium alginate, which amount is effective to sequester part of the calcium cations from the calcium alginate and replace them with sodium cations to an extent such that the unreplaced calcium cations constitute from about 3 percent to about 6.5 percent by dry weight thereof. While a dry mixture of the calcium alginate, calcium sequestrant and other components could be prepared and added to water with agitation, special precautions preferably should be taken in reducing the calcium alginate and the sequestering agent to an extreme state of subdivision such as passing a 200-mesh testing sieve. Moreover, the resulting rheology is not as satisfactory as when sodium alginate or sodium calcium alginate deficient in calcium is employed and when the calcium content is built up under controlled conditions as hereinabove described.

For the purposes of this invention, all or part of the sodium may be replaced by other alkali metals or ammonium. The alkali metal normally consists essentially of, or primarily of, sodium.

DETAILED DESCRIPTION

Further objects, features and advantages of this invention will be apparent from the following exemplification of the practice thereof.

EXAMPLE 1

Composition A

A solid particulate composition is prepared, as follows:

| | parts |
|---|---|
| Sodium alginate* | 69.0 |
| Calcium sulfate | 11.0 |
| Calcium chloride | 4.3 |
| Boric acid | 0.5 |
| Fumaric acid | 1.0 |
| Guar gum | 14.2 |

* Sequestered viscosity 300 cps. in 1 percent solution at 25° C. and contains substantially 1 percent by weight of calcium.

The composition is prepared in such fineness of subdivision that no more than 5 percent is retained in a U.S. Standard Sieve, Series No. 80. It has a moisture content no greater than 13 percent and the pH is between 4.5 and 5.5 As thus prepared, it is stable and may be packaged and shipped for use in the manufacture of a cosmetic lotion having the following composition:

Lotion Formulation

| Composition A | 1.0% |
|---|---|
| Glycerine | 6.0% |
| Methylparasept | 0.2% |
| Ethyl alcohol (denatured) | 5.0% |
| Water (deionized) | 84.8% |

In making the formulation, the initial water content constitutes about 95 percent of the total water of the formulation, the water being at about 150° F. Composition A is made into a slurry with the glycerine and the resulting slurry is added to the water containing the calcium chloride during a period of about 20 seconds. The container in which the slurry was prepared may be rinsed with a small amount of additional water which is added to the mixture, and the mixture subjected to mechanical mixing for a period of about one hour. The methyl-parasept, which serves as a preservative, is dissolved in alcohol and the alcohol containing the dissolved methylparasept is then added to the rest of the formulation and mixing is continued for a brief period. The balance of the water then is added and mixing is continued for a further period of about fifteen minutes. The formulation may then be cooled to a temperature of about 77° and placed in a sealed container.

The lotion has excellent properties as a hand lotion and likewise is highly desirable for other cosmetic applications. Moreover, the lotion can be more readily produced so as to meet control specifications and can be produced at substantially less cost as compared with a cosmetic lotion based on the use of ribbon gum tragacanth.

The following are further examples. In one example a different alkali metal is used to form potassium alginate containing about 1 percent calcium and deficient in the required amount of calcium. In another example, sodium alginate is used and the reacting cation is aluminum. When calcium is the reacting cation, the so-formulated compositions are normally used at 1 percent concentration in the complete lotion. Where aluminum is the reacting cation, such compositions are normally used at 1.5 percent concentration of the complete lotion. All references to viscosity and pH hereinafter mentioned are based on the aforesaid concentrations of the dry composition.

EXAMPLE 2

Composition B

A solid particulate composition is prepared as follows:

|  | parts |
| --- | --- |
| Potassium alginate* | 69.0 |
| Calcium sulfate | 11.0 |
| Calcium chloride | 4.3 |
| Boric acid | 0.5 |
| Fumaric acid | 1.0 |
| Locust bean gum | 14.2 |

* Sequestered viscosity 300 cps. in 1 percent solution at 25° C. Contains about 1 percent by weight of calcium.

The general specifications as regards particle size, moisture content and pH are essentially the same as those of Composition A. Composition B is employed at 1 percent concentration in the formulation as described in Example 1 and produces the same final viscosity.

EXAMPLE 3

Composition C

A solid particulate composition is prepared, as follows:

|  | parts |
| --- | --- |
| Sodium alginate* | 70.0 |
| Aluminum sulfate | 3.0 |
| Aluminum chloride | 3.5 |
| Broic acid | 0.3 |
| Fumaric acid | 0.7 |
| Tara gum | 22.65 |

* Sequestered viscosity 300 cps. in 1 percent solution at 25° C. Contains about 1 percent by weight of calcium.

The general specifications as regards particle size, moisture content and pH are essentially the same as those in the case of Composition A. Composition C is employed at 1.5 percent concentration in the complete lotion which in other respects is prepared as has been described in connection with Example 1. The pH of the lotion is in the same range as that of Example 1, namely, about 4.5 to about 5.5, but the viscosity of the lotion is slightly lower than that of the formulation of Example 1.

EXAMPLE 4

Composition D

The solid particulate composition is prepared, as follows:

|  | parts |
| --- | --- |
| Sodium alginate* | 70.0 |
| Calcium sulfate | 5.5 |
| Calcium chloride | 2.15 |
| Aluminum sulfate | 1.5 |
| Aluminum chloride | 1.68 |
| Boric acid | 0.5 |
| Fumaric acid | 1.0 |
| Tara gum | 17.67 |

* Sequestered viscosity 325 cps. in 1 percent solution at 25° C. Contains about 1 percent by weight of calcium.

The general specifications as regards particle size, moisture content and pH are essentially the same as those in the case of Composition A. Composition D is employed at 1 percent concentration in the complete lotion which in other respects is prepared as has been described in connection with Example 1. The pH of the lotion is about 4.5 to about 5.5 and the viscosity of the complete lotion at 25° C. is about 19,000 cps. The algin salt which constitutes the hydrated swollen particles in the finished lotion is sodium calcium aluminum alginate wherein the dry weight of the calcium content is 2.43 percent and that of the aluminum 0.34 percent.

If for reasons previously described, the calcium chloride is not included in Composition A or Composition B, it should be added to the glycerine slurry along with the balance of the components of said composition. As aforesaid, this insures the maintenance of constant ratio between alginate and calcium which is necessary in plant production on a scale such that the slurry is pumped into the water over a longer period of time. The desired ratio would not be maintained under such conditions if the calcium chloride were to be added to the water instead of to the glycerine and while a measure of control could be obtained by a controlled gradual addition of the calcium chloride the attainment of adequately accurate control would be very difficult. If all of the calcium chloride were to be added to the water and the algin containing slurry were to be added gradually, the initial addition of the slurry would be met with an excessive concentration of calcium chloride. To make such a procedural method workable, the addition of the calcium chloride to the water would need to be prorated in relation to the rate of addition of the slurry of Composition A. Similar considerations apply in the case of the aluminum sulfate and aluminum chloride of Composition C and to their salts and the calcium chloride of Composition D.

In the foregoing examples the calcium and aluminum salts contained the water of crystallization that normally is present in such compounds, namely, calcium sulfate $2H_2O$; calcium chloride $2H_2O$; aluminum sulfate $18H_2O$ and aluminum chloride $6H_2O$.

I claim:

1. An aqueous cosmetic lotion of flowable and pourable consistency wherein the base which imparts desired rheology consists essentially of hydrated swollen particles of an algin salt of calcium and of a cation selected from the group consisting of alkali metals and ammonium, said calcium constituting from about 3 percent to about 6.5 percent by dry weight of said algin salt, said particles being dispersed in the form of an interrupted gel in a continuous fluid aqueous medium having dissolved therein as an anti-gelling agent for maintaining the particulate condition of said particles a mannogalactan gum selected from the group consisting of tara, guar and locust bean, the dry weight of said algin salt being from about 0.5 percent to about 1.1 percent of the weight of said lotion, the dry weight of said gum being from about 0.14 percent to about 0.24 percent of the weight of said lotion, and the ratio by dry weight of said algin salt to said gum being from about 5:1 to about 3:1, said lotion also containing from about 6 percent to about 10 percent of glycerine, from about 4 percent to about 8 percent of alcohol and from about 0.009 percent to about 0.011 percent of an acid selected from the group consisting of fumaric, adipic, malic, tartaric and citric, and said lotion having a viscosity at 25° C. of between about 5,000 and about 20,000 cps.

2. An aqueous cosmetic lotion according to claim 1 which also contains from about 0.004 percent to about 0.006 percent of boric acid.

3. An aqueous cosmetic lotion according to claim 1 wherein said hydrated swollen particles consist essentially of sodium calcium alginate.

* * * * *

UNITED STATES PATENT OFFICE
CERTIFICATE OF CORRECTION

Patent No. 3,764,707         Dated October 9, 1973

Inventor(s)  Francis Habersberger

It is certified that error appears in the above-identified patent and that said Letters Patent are hereby corrected as shown below:

In the title of the patent, first line, delete "FOR", and insert instead --TAN--;

In the Abstract, line 10, after "of", insert --cations selected from the group consisting of alkali metals and ammonium in--;

Column 8, line 4, after "5.5", insert a period;

Column 8, line 64, "insolubilizing" is misspelled;

Column 10, line 30, after "5.5", insert a period.

Signed and sealed this 12th day of March 1974.

(SEAL)
Attest:

EDWARD M. FLETCHER, JR.
Attesting Officer

C. MARSHALL DANN
Commissioner of Patents